United States Patent [19]
Yamada

[11] Patent Number: 5,283,841
[45] Date of Patent: Feb. 1, 1994

[54] IMAGE PROCESSING METHOD AND APPARATUS

[75] Inventor: Shigeki Yamada, Kawasaki, Japan

[73] Assignee: Canon Kabushiki Kaisha, Tokyo, Japan

[21] Appl. No.: 677,100

[22] Filed: Mar. 29, 1991

[30] Foreign Application Priority Data

| Mar. 30, 1990 [JP] | Japan | 2-86156 |
| Mar. 30, 1990 [JP] | Japan | 2-86157 |
| Mar. 30, 1990 [JP] | Japan | 2-86160 |
| Mar. 30, 1990 [JP] | Japan | 2-86161 |

[51] Int. Cl.$^5$ ............................................. G06K 9/40
[52] U.S. Cl. .................................. 382/54; 358/445; 358/453; 382/44; 348/594; 348/601
[58] Field of Search ................. 382/54, 41, 48, 9, 1, 382/44-47; 358/445, 448, 453, 450, 409, 903, 22, 75, 183; 395/100, 129, 133, 141, 137-139; H04N 1/36, 1/40

[56] References Cited
U.S. PATENT DOCUMENTS

| 4,720,871 | 1/1988 | Chambers | 382/41 |
| 4,741,046 | 4/1988 | Matsunawa et al. | 382/9 |
| 4,953,227 | 8/1990 | Katsuma et al. | 382/18 |
| 4,956,704 | 9/1990 | Yamada | 358/80 |
| 4,956,872 | 9/1990 | Kimura | 382/48 |
| 5,038,223 | 8/1991 | Yamada | 358/445 |

*Primary Examiner*—Joseph Mancuso
*Attorney, Agent, or Firm*—Fitzpatrick, Cella, Harper & Scinto

[57] ABSTRACT

There is disclosed an image processing method for obtaining a pictorial image from an input image. In this method, image data is input from an image input unit. A paint brush pattern is formed on the basis of an input from an operator. Painting processing of the formed paint brush pattern is executed on the input image data. There is also disclosed an image processing apparatus for carrying out this method.

14 Claims, 15 Drawing Sheets

FIG. 4(1)

| 1 | 1 | 1 |
|---|---|---|
| 0 | 0 | 0 |
| -1 | -1 | -1 |

FIG. 4(2)

| 0 | 1 | 1 |
|---|---|---|
| -1 | 0 | 1 |
| -1 | -1 | 0 |

FIG. 4(3)

| -1 | 0 | 1 |
|---|---|---|
| -1 | 0 | 1 |
| -1 | 0 | 1 |

FIG. 4(4)

| -1 | -1 | 0 |
|---|---|---|
| -1 | 0 | 1 |
| 0 | 1 | 1 |

FIG. 18
| 25 | 50 | 255 |
|----|----|-----|
| F 25 | E 50 | D 255 |
| 25 | 50 | 255 |
FIG. 19
| 5 | 30 | 235 |
|---|----|-----|
| 5 | 30 | 235 |
| 5 | 30 | 235 |
FIG. 20
| DIRECTION OF PAINT BRUSH | | | | |
|---|---|---|---|---|
|  |  |  |  |  |
| SIZE OF PAINT BRUSH | | |
|---|---|---|
|  |  |  |
| COLOR OF PAINT BRUSH | | | | | |
|---|---|---|---|---|---|
| RED | PURPLE | GREEN | YELLOW GREEN | LIGHT BLUE | BLUE |
| RED PURPLE | ……… | ……… | | | |
| | | | | | |

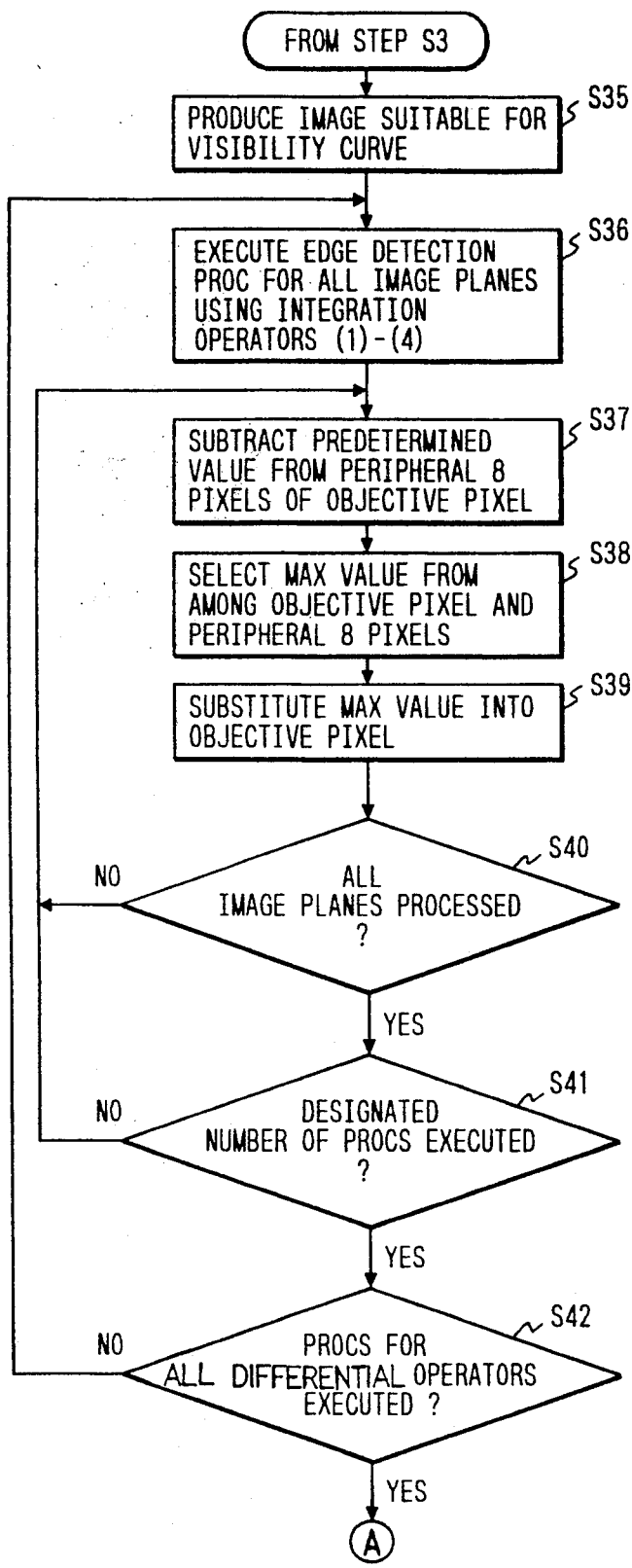

IMAGE PROCESSING METHOD AND APPARATUS

BACKGROUND OF THE INVENTION

1. Field of the Invention

The present invention relates to an image processing method and apparatus for converting, e.g., original image data into aesthetic image data having a pictorial touch.

2. Related Background Art

As a conventional method of creating an aesthetic image upon application of an image processing technique, mosaic processing is known. Mosaic processing of an image is executed in units of blocks each consisting of, e.g., a total of 25 pixels (5×5 pixels in the X and Y directions, respectively). More specifically, if original image data at an address (x, y) is represented by a(x, y), mosaic-processed image data a'(x, y) is obtained by equation (1):

$$a'(5m-i, 5n-j) = a(5m-3, 5n-3) \quad (1)$$

where
- i, j = pixel number (1, 2, 3, 4, 5)
- m, n: block number (1, 2, 3, ...)

More specifically, central pixel data a(5m−3, 5n−3) in each block is used as a representative value in equation (1), and all the pixel data a'(5m−i, 5n−j) in each block are replaced with the representative value, thus executing the mosaic processing. Note that the representative value is not limited to the central pixel data but may be represented by any pixel data in a block. In addition, an intra-block average value may be calculated.

An application of the mosaic processing to pictorial expression is illustrated in U.S. Pat. No. 4,953,227. In this prior art, mosaic pattern is generated at a random position using a random function, or the size of a mosaic pattern is changed in accordance with a contrast or spatial frequency characteristics of original image data.

The present inventor's U.S. Pat. No. 5,038,223, and commonly assigned U.S. Pat. No. 4,956,872 disclose a technique for obtaining a pictorial image using a paint brush pattern, and U.S. patent application Ser. No. 174,979 discloses a technique for executing mosaic processing in accordance with an edge direction.

In these documents, however, since the pattern, painting position, and painting color constituting a mosaic are automatically determined, if an identical original image is used, uniform results can be obtained by anyone, and the individualities of the operators cannot be reflected in the results.

In these documents, as described above, the entire image plane is painted with the same pattern, or an edge component of image data is detected, and painting is performed using different paint brush patterns in accordance with the presence/absence of an edge.

However, when a person draws a picture on a canvas, at an edge portion, he or she normally moves a paint brush in accordance with the directivity of the edge portion (i.e., along the edge) to draw a picture.

Therefore, when painting is performed by only discriminating the presence/absence of fine edges, a portion where the directivity of an edge does not coincide with a direction of a paint brush may be formed, and an unnatural result is obtained.

In an information apparatus of this type, an operator performs an operation such as selection of an original image using an instruction means such as a pointing device.

However, since such conventional apparatus has only one instruction means (referred to herein as a P.D), only one person can operate the apparatus at the same time. Therefore, when a plurality of operators operate an apparatus, for example, when a teacher teaches an operation method to students, one mouse must be alternately used during teaching.

SUMMARY OF THE INVENTION

The present invention has been made to eliminate the conventional drawbacks, and has as its object to provide an image processing method and apparatus which can obtain a result approximate to a painting drawn by a person.

It is another object of the present invention to provide an image processing method and apparatus, with which an operator can create a paint brush pattern, and arbitrary painting processing can be performed using the created paint brush pattern.

It is still another object of the present invention to provide an image processing method and apparatus, which detects an edge direction on the basis of data obtained by dispersing an edge of an image to be fat, and arranging a paint brush pattern in accordance with the detection result, thus allowing high-quality painting processing.

It is still another object of the present invention to provide an image processing method and apparatus which can automatically convert an input image into various painting touch images by a simple operation for creating a paint brush pattern.

It is still another object of the present invention to provide an image processing method and apparatus with which an intermediate result of automatic painting processing can be manually processed, and an individuality and will of an operator can be reflected in an output result by a simple operation.

It is still another object of the present invention to provide an image processing method and apparatus with which a pattern can be created, the directivity, size, and the like of the pattern can be changed, high-grade image conversion can be performed by a simple operation, and the individuality of an operator can be reflected in a result.

It is still another object of the present invention to provide an image processing apparatus which comprises a plurality of instruction means such as pointing devices which can be used at the same time, and provides functional differences to the pointing devices, so that if one performs a wrong operation, the operation flow cannot advance to the next step unless the other performs a confirmation operation.

The above and other objects of the present invention will become apparent from the following detailed description taken in conjunction with the accompanying drawings.

BRIEF DESCRIPTION OF THE DRAWINGS

FIGS. 4(1) to 4(4) show differential operators adopted in this embodiment;

FIG. 18 shows a state of an objective pixel E shown in FIG. 17, and its surrounding eight pixels;

FIG. 19 shows a state wherein a pixel group shown in FIG. 18 undergoes a dispersion algorithm;

FIG. 20 shows a setting state of attributes of a paint brush pattern; and

DETAILED DESCRIPTION OF THE PREFERRED EMBODIMENT

The preferred embodiment of the present invention will be described in detail below with reference to the accompanying drawings.

The present invention may be realized by a system constituted by a plurality of devices, or may be realized by one device, or may be realized by supplying a program to, e.g., a work station.

System Block Diagram

Figure 14:
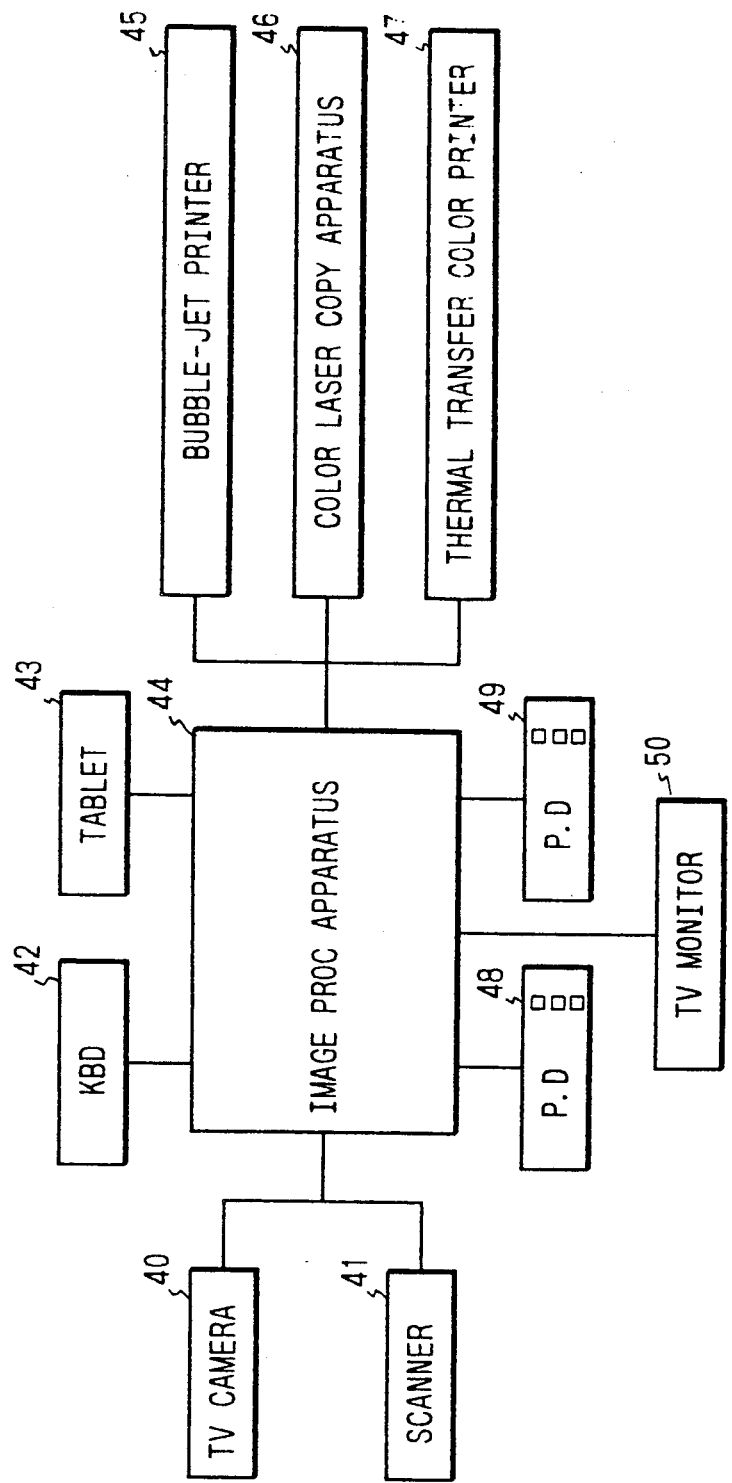
FIG. 14 is a system block diagram of an image processing apparatus.

FIG. 14 is a system block diagram of an image processing apparatus of this embodiment. A TV camera 40 for inputting an image, a scanner 41 for inputting an image, a keyboard 42 for inputting a command to an image processing apparatus 44, and a tablet 43 for inputting coordinate data to the image processing apparatus 44 are connected to the image processing apparatus 44 of this embodiment. Output devices for outputting an image as a processing result, e.g., a bubble-jet printer 45 (FIG. 5), a color laser copy apparatus 46 (FIG. 3), and a thermal transfer color printer 47, and pointing devices (P.Ds) 48 and 49 (e.g., mouses) for inputting coordinate data to the image processing apparatus are also connected to the image processing apparatus 44. A TV monitor 50 can display the progress of processing, and can display and select parameters necessary for processing.

Block Diagram

Figure 1:
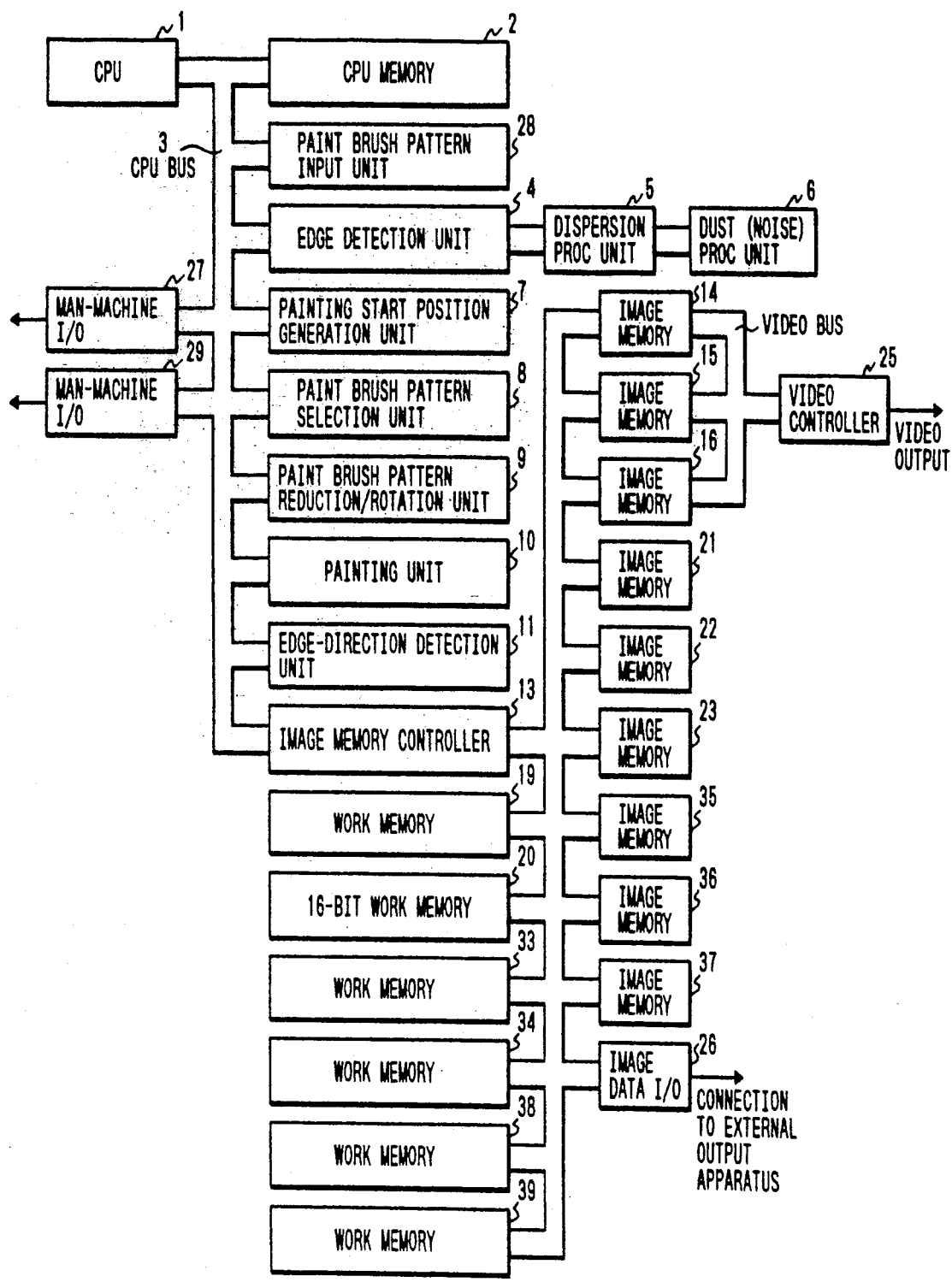
FIG. 1 is a block diagram of an image processing apparatus according to an embodiment of the present invention.

FIG. 1 is a block diagram of the image processing apparatus according to the embodiment of the present invention. The arrangement shown in FIG. 1 corresponds to the image processing apparatus 44 shown in FIG. 14. In FIG. 1, a central processing unit (CPU) 1 performs main control of the apparatus of this embodiment. A CPU memory 2 stores programs shown in flow charts (to be described later) to be executed by the CPU 1, parameters necessary for the processing, and the like in a ROM or RAM (not shown). A CPU bus 3 includes an address bus, a data bus, and a control bus for the CPU 1.

An image data I/O 26 is connected to an image reading apparatus such as the TV camera 40, the scanner 41, or the like shown in FIG. 14, or an image output apparatus such as the bubble-jet printer 45, the color laser copy apparatus 46, or the like, so as to input/output image data before and after painting processing. Image memories 21 to 23 store data in units of 8 bits/pixel. More specifically, the image memories 21 to 23 store R (red), G (green), and B (blue) primary color original image data read through the image data I/O 26. Work memories 19, 33, 34, 38, and 39 store data in units of 8 bits/pixel. More specifically, the work memories 19, 33, 34, 38, and 39 store results of arithmetic processing performed for image data stored in the image memories 21 to 23. Man-machine I/Os 27 and 29 can connect an input device such as the keyboard 42, the pointing devices or P.Ds 48 and 49, the tablet 43, or the like shown in FIG. 14. Output image memories 35 to 37 store processing results. Display image memories 14 to 16 store data obtained by reducing or enlarging contents stored in the output image memories 35 to 37. An enlargement or reduction ratio is automatically set in accordance with a resolution of the TV monitor 50 (FIG. 14) connected to a video controller 25. The monitor 50 used in this embodiment can display a maximum of 1,280 × 1,024 pixels, and a magnification is set so that the entire image plane falls within this range.

A 16-bit work memory 20 stores data in units of 16 bits/pixel. More specifically, the work memory 20 temporarily stores product-sum results of image data stored in the image memories 21 to 23. The video controller 25 can connect the monitor 50 or a video printer (not shown) to monitor image data before and after painting processing.

An edge detection unit 4 detects an edge portion in an original image from image data obtained by color-mixing image data stored in the image memories 21 to 23. This is to change the characteristics and shapes of paint brush patterns to be formed between an edge portion (contrast portion) and a flat portion in original image data. A dispersion processing unit 5 performs dispersion processing for edge data output from the edge detection unit 4. The unit 5 will be described in detail later. A dust (noise) processing unit 6 removes isolated noise patterns having small areas from the dispersion-processed edge data to leave necessary edge portions. An edge direction detection unit 11 detects the presence/absence of a directivity of a detected edge portion, and its direction when the directivity is detected. A paint brush pattern input unit 28 can input a paint brush pattern using the P.Ds 48 and 49 or the tablet 43 connected to the man-machine I/O 27 or 29. A painting start position generation unit 7 comprises a random function generation means, and generates a random painting position of paint brush pattern data. A paint brush pattern reduction/rotation unit 9 reduces and rotates a paint brush pattern input by the paint brush pattern input unit 28 to form a plurality of types of paint brush pattern data.

A paint brush pattern selection unit 8 selects a paint brush pattern suitable for a painting position generated by the painting start position generation unit 7 from a plurality of paint brush patterns formed by the paint brush pattern reduction/rotation unit 9. A painting unit 10 paints paint brush pattern data selected by the paint brush pattern selection unit 8 at the randomly generated painting position on original image data. An image memory controller 13 performs necessary control of the image memories in synchronism with processing operations of the respective units.

Flow Chart of Overall Painting Processing

Figure 2:
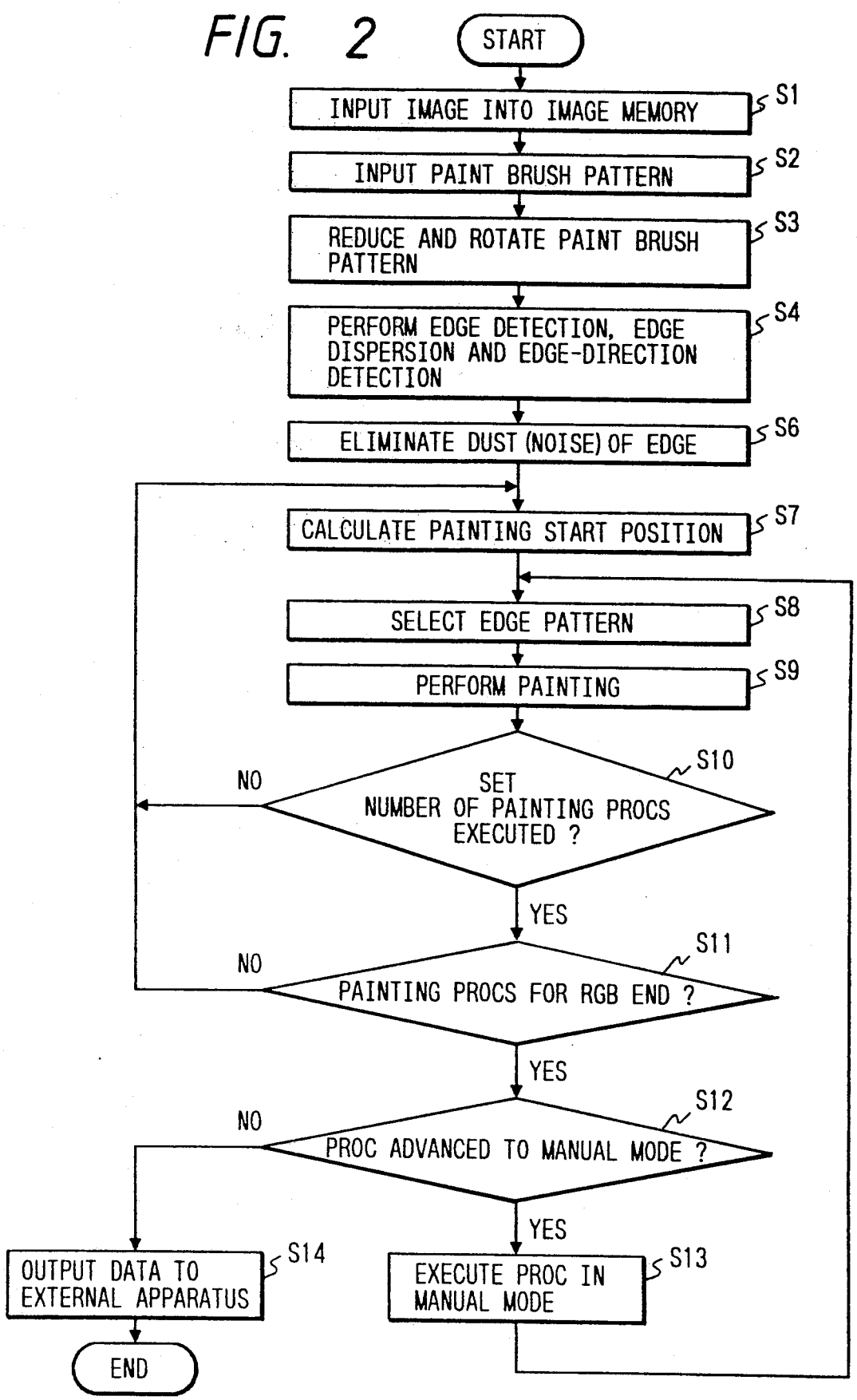
FIG. 2 is a flow chart showing painting processing of this embodiment.

FIG. 2 is a flow chart showing the overall painting processing sequence of this embodiment. In the following description, original image (density) data at an address (x, y) is expressed by $a_i(x, y)$. The suffix i is replaced with R, G, or B to individually express R, G, or B image data. Furthermore, image data $a_i(x, y)$ consists of 8 bits (capable of expressing 0 to 255 as gradation levels). A value of maximum density data (darkest data) is indicated by a gradation level "0", and a value of minimum density data (lightest data) is indicated by a gradation level "255".

The same input devices such as P.Ds or tablets are connected to the man-machine I/Os 27 and 29. That is, two P.Ds or two tablets are connected. In this embodiment, P.Ds are used. The CPU 1 discriminates which of the I/Os 27 and 29 input a signal, so that the respective units can discriminate the I/Os. More specifically, assuming that data from the P.D is 8-bit data, if the most significant bit (MSB) of the 8-bit data is "1", it indicates data from the I/O 27; if it is "0", it indicates data from the I/O 29. This is to provide a functional difference to the P.Ds connected to the I/Os 27 and 29. In this embodiment, the P.D connected to the I/O 27 is for a student, and the P.D connected to the I/O 29 is for a teacher. These P.Ds have a functional difference. A detailed description will be made later in a description of a processing sequence.

Step S1

Figure 8:
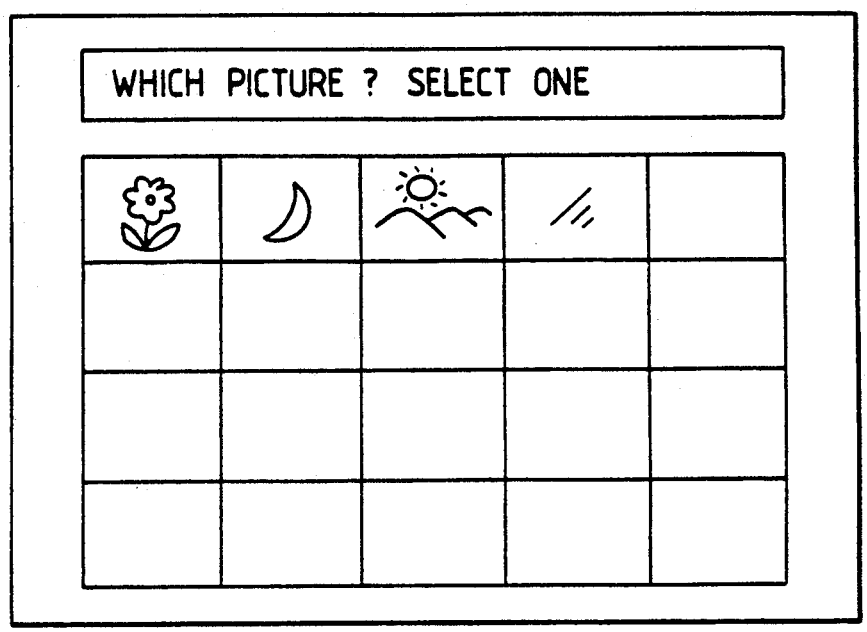
FIG. 8 shows a display example of an image input menu frame.

A student or a teacher selects an input image from a menu shown in FIG. 8 using the P.D. The images shown in FIG. 8 are read through the TV camera 40 or the scanner 41 shown in FIG. 14, and are stored in a storage device such as a hard disk drive (not shown) via the I/O 26. The CPU 1 externally fetches original image data R, G, and B via the image data I/O 26 in accordance with the designation in the menu, and stores these data in the image memories 21 to 23, respectively. The contents of the image memories 21 to 23 are copied to the output image memories 35 to 37, respectively. At the same time, the image memory controller stores the contents of the image memories 35 to 37 in the image memories 14 to 16 at a proper magnification. The magnification is automatically set, so that the contents of the image memories 35 to 37 can be stored in the image memories 14 to 16 in a maximum size without being cut. For example, if an input image size is 2,700×2,048 pixels and the size of each of the image memories 14 to 16 is 1,280×1,024 pixels, an input image is reduced to 1,280×901 pixels at a magnification of 0.474, and the reduced image is stored in the image memories 14 to 16. With this function, the entire image can be observed on the monitor connected to the video controller 25 regardless of the input image size.

Step S2

Figure 9:
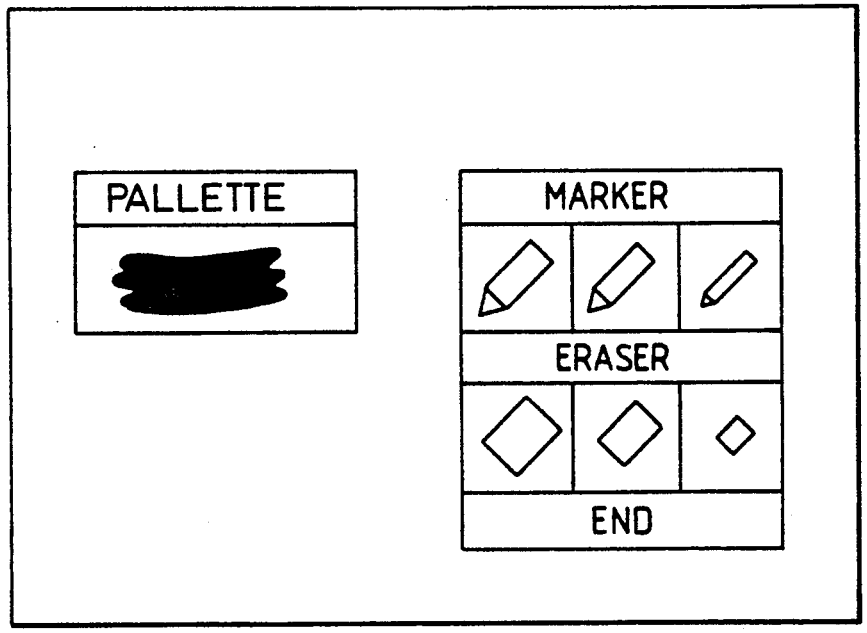
FIG. 9 shows a display example for inputting a paint brush pattern.

As shown in FIG. 9, a window for inputting a horizontally extended paint brush pattern is displayed on the monitor, and each of the teacher and the student moves his or her P.D while depressing a button to draw a paint brush pattern on the window on the monitor, thus designing a unique paint brush pattern. More specifically, the paint brush pattern input unit 28 receives position data (x, y) from the P.D, and data indicating whether the P.D button is depressed. If the button is depressed, the unit 28 draws a circle having a radius r at a position corresponding to (x, y) in the window. As a result, when the teacher or student moves the P.D while depressing the button, circles each having the radius r can be successively drawn in the window. Thus, he or she can design a paint brush pattern having a desired shape and size. A button capable of selecting the thickness of a pen, an eraser button, and a button for ending design processing are displayed on a window different from the window for inputting a paint brush pattern. When one of these buttons is selected by the P.D, the teacher or student can draw or erase a pattern with a pen having a desired thickness. Therefore, the teacher performs demonstration using his or her P.D while teaching an operation procedure, and the student can execute an operation accordingly. Operations of these two persons can be executed simultaneously.

Input of Paint Brush Pattern

Figure 13:
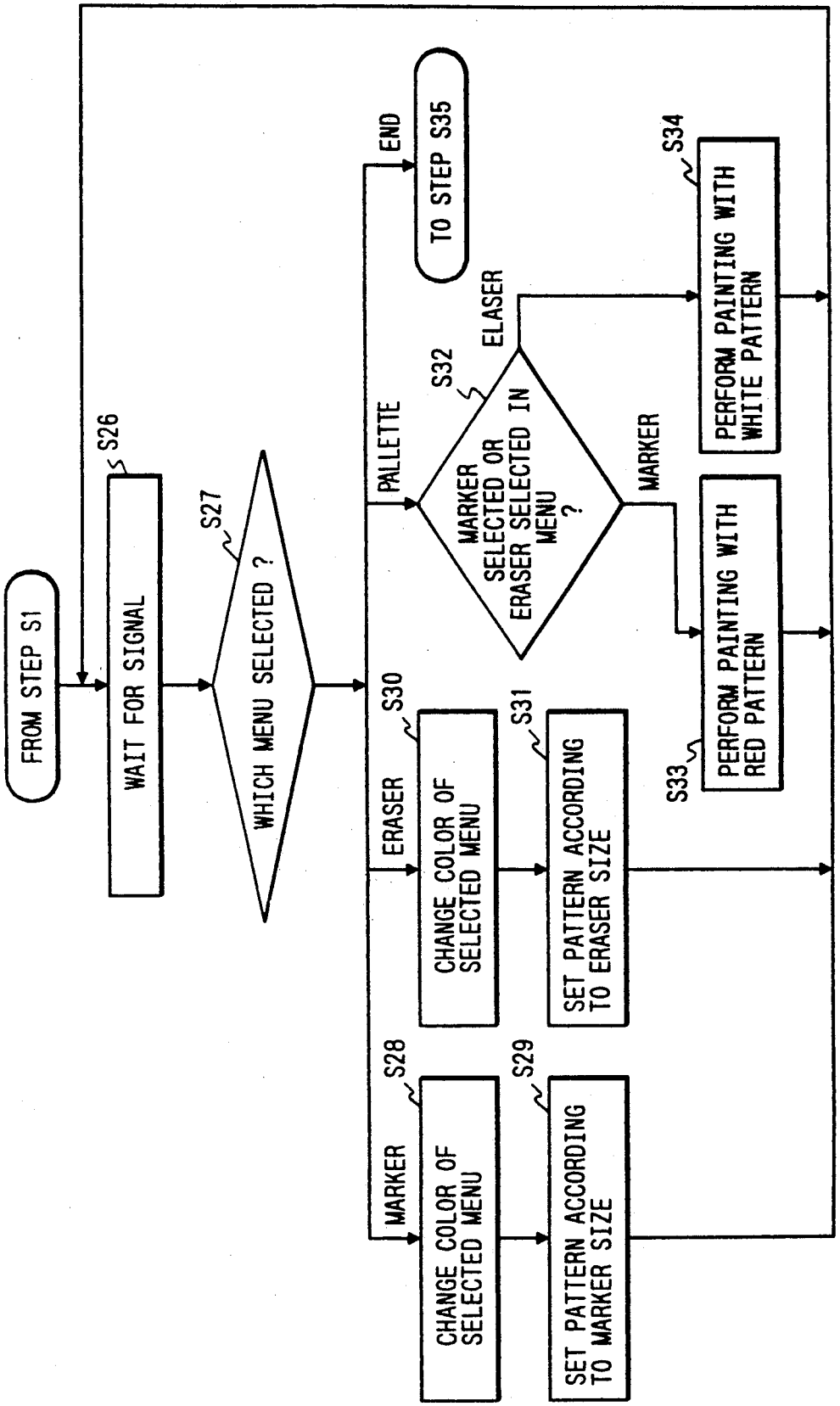
FIG. 13 is an input control flow chart of a paint brush pattern.

The input operation of a paint brush pattern in step S2 in FIG. 2 will be described in detail below with reference to the flow chart shown in FIG. 13.

Step S26

When the control enters step S2 in FIG. 2, the system waits for a signal from the P.D.

Step S27

A selected menu item is detected. If an item "marker" is selected, the flow advances to step S28; if "eraser" is selected, the flow advances to step S30; if a pallette is selected, the flow advances to step S32; and if another menu item ("end") is selected, the flow advances to step S35. Since step S35 will be described later, description thereof will be omitted here.

Step S28

The selected menu item "marker" is displayed in another color. In this embodiment, a display color turns from green to yellow appearing as if a button is illuminated.

Step S29

The painting unit 10 stores binary patterns according to the sizes of markers and erasers, and a pattern according to a marker size selected in step S28 is set. The flow then returns to step S26.

Step S30

The selected menu item "eraser" is illuminated in another color like in step S28.

Step S31

A pattern according to a selected eraser size is set like in step S29.

Step S32

Which size of a menu item of the marker or eraser is selected is discriminated.

Step S33

If the marker is selected, painting can be performed in a pallette using a pattern of the selected marker. The paint brush pattern need only be binary data, and painting can be performed using a red pattern in a white pallette. As shown in FIG. 9, a paint brush pattern can be formed.

Step S34

Painting using the eraser is performed like in step S33. A difference from step S33 is that a painting color is white. Since painting is performed using a white pattern on a white pallette, a red painted portion by the marker can be erased.

When a design of a paint brush pattern is ended, the student selects the "end" button using the P.D. Furthermore, when the teacher selects the "end" button using the P.D, the flow can advance to the next step.

Figure 12:
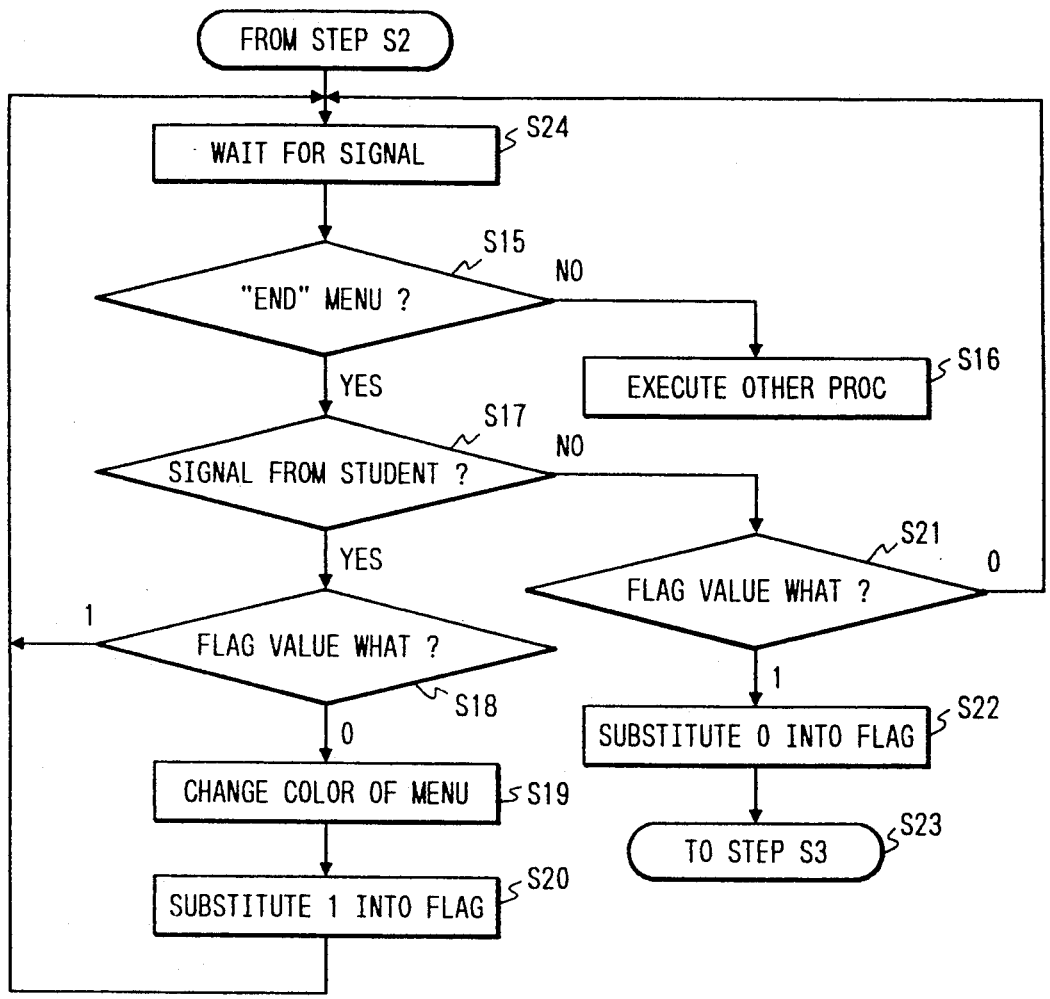
FIG. 12 is a flow chart of function control for a plurality of P.Ds.

The function of a plurality of P.Ds will be described in detail below with reference to the flow chart shown in FIG. 12.

Step S24

When the control enters step S2 in FIG. 2, the system waits for a signal from the P.D.

Step S15

It is checked if the "end" button (see FIGS. 9 and 10) is selected. If the "end" button is selected, the flow advances to step S17; if a portion other than the "end" button is selected, the flow advances to step S16 to execute other processing (processing for drawing or erasing a pattern using a pen or an eraser).

Step S17

5 It is checked if a signal is input from the teacher's or student's P.D. As described above, if the MSB of the signal is "1", it can be determined that the signal is input from the student's P.D; if it is "0", it can be determined that the signal is input from the teacher's P.D. If a signal from the teacher's P.D is detected, the flow advances to step S21; if a signal from the student's P.D is detected, the flow advances to step S18.

Step S18

It is checked if the student has already selected the "end" menu item. If a decision variable flag is "1", it can be determined that the student has already selected the "end" item, and the flow returns to step S24. However, if the flag is "0", the flow advances to step S19.

Step S19

In order to clarify that the student selected the "end" menu item, the display color of the "end" menu item is changed. In this embodiment, the display color is changed from light green to dark green. The flow advances to step S20.

Step S20

"1" is set in the flag, and the flow returns to step S24.

More specifically, when the student selects the "end" menu item, a loop of steps S24, S15, S17, and S18 is repeated until the teacher selects the "end" menu item.

Step S21

A signal to step S21 is one from the teacher. It is checked if the student has already selected the "end" menu item. If it is determined that the "end" menu item has not been selected yet, i.e., if the flag is "0", the flow returns to step S24. If the student has already selected the "end" menu item, the flow advances to step S22.

Step S22

The flag is reset to "0".

Step S23

The flow advances to the next processing routine, i.e., to step S3.

On the contrary, when the teacher selects the "end" menu item first, the flow cannot advance to the next step. In order to cause the flow to advance to the next step, double checking operations are performed to prevent the flow from erroneously advancing to the next step. In this manner, the apparatus of the present invention has a plurality of P.Ds having the same shape in their appearances, and these P.Ds have different functions, thereby reducing a probability of operation errors. In this embodiment, the teacher and the student have been exemplified. However, the present invention is not limited to this. For example, a plurality of P.Ds having different functions may be arranged, and their operation sequences may be controlled. When the "end" menu item is selected, the flow advances to step S16.

Step S3 in FIG. 2

Figure 6A:
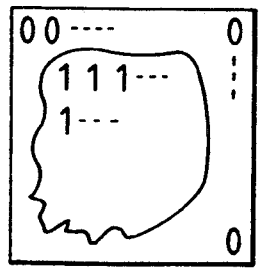
FIGS. 6A to 6E show paint brush patterns created by a paint brush pattern reduction/rotation unit.
Figure 6B:
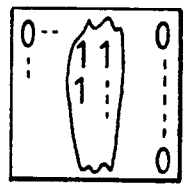
Figure 6C:
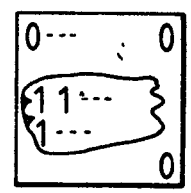
Figure 6E:
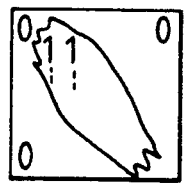
Figure 6D:
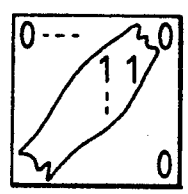

After a paint brush pattern is determined in FIG. 9, the control transits to the paint brush pattern reduction/rotation unit 9. The reduction/rotation unit 9 fetches paint brush pattern data on the window as binary data in its internal memory. When the fetching operation is ended, the image memory controller 13 deletes the window which is displayed to form paint brush pattern data, and the image memories 14 to 16 are reset to states before the window is displayed. The paint brush pattern data is reduced according to a reduction ratio stored in advance in the reduction/rotation unit 9. Two sets of reduction ratios are prepared. One set of reduction ratios include the same longitudinal and lateral ratios, and the other set include a lateral ratio smaller than a longitudinal ratio. That is, a paint brush pattern having no directivity is obtained. The horizontally extended paint brush pattern which is reduced at the same longitudinal and lateral ratios is rotated. The pattern is rotated in a total of three different ways at rotational angles up to $\frac{3}{4}\pi$ in units of $\frac{1}{4}\pi$. The results are stored in the internal memory of the paint brush pattern reduction/rotation unit 9. As a result, a total of five paint brush patterns, i.e., paint brush patterns having directivities in four directions, and a large paint brush pattern having a horizontal-vertical ratio smaller than the above four patterns are formed, as shown in FIGS. 6A to 6E. FIG. 6A shows a large pattern having no directivity, FIG. 6B shows a vertically extending pattern, FIG. 6C shows a horizontally extending pattern, FIG. 6D shows a pattern obliquely extending in an upper right direction, and FIG. 6E shows a pattern obliquely extending in an upper left direction.

Step S4

Figure 21B:
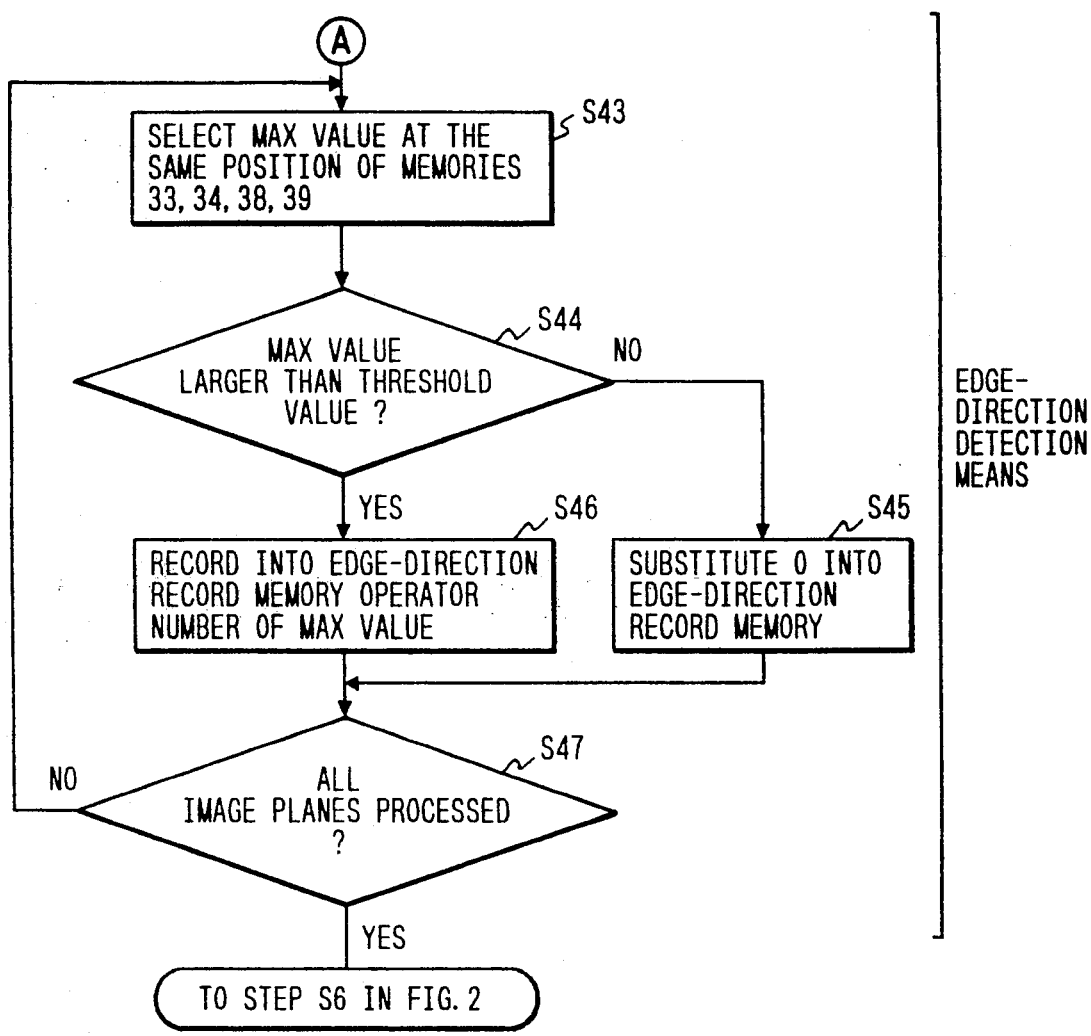
FIG. 21, consisting of FIGS. 21A and 21B, is a flow chart showing edge detection, dispersion, and edge direction detection algorithms.

In this step, edge detection, edge dispersion, and edge direction detection are executed. FIG. 21 shows a detailed flow chart.

Detection and Dispersion of Edge, and Detection of Edge Direction

Step S35 in FIG. 21

In this edge extraction processing, image data matching with a visibility curve of man is generated according to equation (2):

$$a(x,y) = \frac{1}{10} \{3a_R(x,y) + 6a_G(x,y) + a_B(x,Y)\} \quad (2)$$

In equation (2), original image data R, G, and B are added at a ratio of 0.3:0.6:0.1. Since a painting is visually appreciated, original image data are added in correspondence with a visibility curve of man to perform edge evaluation. In this case, in order to perform a product-sum calculation in { } of the right-hand side, product-sum results are temporarily stored in the 16-bit work memory 20. A content obtained by multiplying the product-sum result in { } with 1/10 is stored in upper 8 bits of the 16-bit work memory 20.

Step S36

Edge detection processing of upper 8-bit data in the 16-bit work memory 20 is performed using differential operators in, e.g., a 3×3 matrix. FIG. 4 shows differential operators used in this embodiment. Edges in four directions can be detected by four types of differential operators. First, a result of edge detection using the differential operator (1) shown in FIG. 4 is stored in the work memory 33.

Step S37

In steps S37 to S42, edge dispersion is executed. This is to disperse an edge area so as to align the directivities of paint brushes output near the edge since an edge becomes too thin based on only the result obtained by the 3×3 differential operator matrix when the direction of edge data is detected, and a paint brush pattern is drawn along the detected direction. More specifically, a predetermined value is subtracted from each of eight peripheral pixels surrounding an objective pixel. In this case, the predetermined value is, e.g., 20. Since the maximum value of the peripheral eight pixels affects the influence on the objective pixel, as the maximum value is smaller, the influence is enhanced. In this case, the maximum value affects the influence on an objective pixel E upon dispersion of a pixel D. More specifically, a lightness difference at an edge portion is eliminated.

Step S38

The maximum value is selected from among the objective pixel and peripheral eight pixels.

Step S39

The maximum value is substituted into the objective pixel.

Step S40

If processing operations in steps S37 to S39 are performed for all the image planes, the flow advances to step S41; otherwise, the flow returns to step S37.

Step S41

The number of times of dispersion processing is recorded in advance in the dispersion processing unit 5 (FIG. 1). The number of times of processing in this embodiment is 3.

If the processing operations in steps S37 to S40 are executed by the designated number of times, the flow advances to step S42; otherwise, the flow returns to step S37. As the number of times increases, the degree of dispersion is increased.

Step S42

If processing is performed for all the operators (1) to (4) shown in FIG. 4, the flow advances to step S43; otherwise, the flow returns to step S36. The processing results are stored in the work memories 33, 34, 38, and 39 in accordance with the operators (1) to (4).

Step S43

A maximum value at the same positions on the work memories 33, 34, 38, and 39 is selected.

Step S44

If the selected maximum value is larger than a threshold value, e.g., 20 (having no connection with the predetermined value in step S37), the flow advances to step S46; otherwise, the flow advances to step S45.

Step S45

It is determined that an edge has no directivity, and "0" is substituted into the edge-direction record work memory 33.

Step S46

The differential operator used in the edge detection and dispersion processing, which operator generated the maximum value, is determined, and its operator number is recorded in the edge-direction record work memory 33. As a result, all the pixels in the work memory 33 consist of 5-value data (0 to 4).

Figure 15:
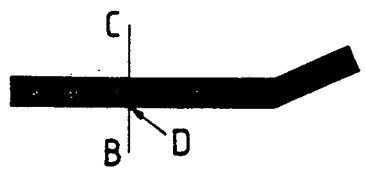
FIG. 15 shows an image pattern including a portion having a large lightness difference.
Figure 16:
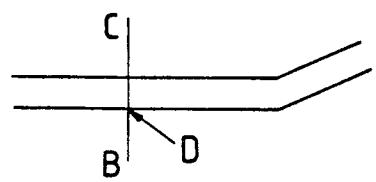
FIG. 16 is an explanatory view of edge detection.
Figure 17:
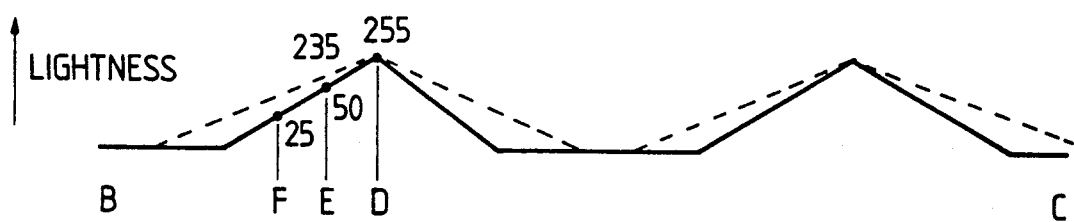
FIG. 17 shows a lightness difference and edge dispersion of a portion B - C in FIG. 16.

The dispersion means will be described in detail below with reference to the accompanying drawings. Assume that an image includes a portion having a large lightness difference, as shown in FIG. 15. When edge detection is performed using the differential operator (1) in FIG. 4, an edge shown in FIG. 16 is detected. The lightness on a straight line BC has values indicated by straight lines in FIG. 17. If a point E in FIG. 17 is assumed to be an objective pixel, its peripheral pixel values (values representing their lightnesses) are as shown in FIG. 18. When the predetermined value is subtracted from each of the peripheral eight pixels of the objective pixel according to the above-mentioned diffusion algorithm, a matrix shown in FIG. 19 is obtained. Since a maximum value among the nine pixels is 235, the value of the point E is 235. When this arithmetic operation is performed for all the image planes, the skirt of the mountain is extended, as indicated by dotted lines in FIG. 17, and an edge is dispersed. More specifically, a stepwise lightness difference is obtained. When this operation is further repeated, the edge is extended more.

Needless to say, the CPU 1 discriminates a pointer for specifying an objective pixel, and updates it.

The edge-direction detection means will be described in detail below.

For example, in FIG. 15, upon comparison of results obtained by performing edge detection and dispersion using the operators (1) to (4), we have a relation "the result by the operator (1)>the result by the operator (2)≃the result by the operator (4)>the result by the operator (3)". Since an edge near a point D is a lateral edge, the value obtained by the operator (1) which can easily detect the lateral edge becomes largest. In the above-mentioned case, since the value of the point D is 235, and is larger than a threshold value (=25), the operator number, 1, representing a directivity is recorded at the point D on the edge-direction record work memory 33.

Step S6 in FIG. 2

Dispersed edge data obtained in step S4 normally include many small, isolated noise or dust components. The dust processing unit 6 calculates areas of all the edge data stored in the work memory 33 on the basis of discrimination results of the presence/absence of continuity and deletes data having areas equal to or smaller than a predetermined area as noise patterns. The presence/absence of continuity is discriminated according to the following relation (3) if objective edge data in the work memory 33 is represented by a(x, y):

$$\text{That is,} \quad (3)$$
$$\text{when } a(x,y) \neq 0,$$
$$\text{it is checked if } a(x + i, y + j) \neq 0.$$

where i and j are integers respectively satisfying $-1 \leq i \leq 1$ and $-1 \leq j \leq 1$. That is, if at least one pixel satisfies the relation $a(x+i, y+j) \neq 0$, the presence of continuity is determined. More specifically, the central pixel in a 3×3 block is determined as an objective pixel, and continuity with its peripheral eight pixels is discriminated. When continuity can be detected for only two pixels or less, the block is determined as noise, and edge data is set to be "0".

Step S7 in FIG. 2

In step S7, the painting start position generation unit 7 generates painting position data of a paint brush pattern. When painting positions of a paint brush pattern are regularly and sequentially generated, natural pictorial expression is impaired. Thus, in this embodiment, the painting positions are randomly generated.

First, painting position data are generated for original image data R (Red). The painting start position generation unit 7 includes a random number generation means. When the random number generation means receives, e.g., three random number generation parameters (an integer for giving a random number generation series in a row direction, an integer for giving a random number generation series in a column direction, and the number of random numbers to be generated) from the CPU 1, it generates random numbers in a corresponding mode. The painting start position generation unit 7 determines a painting start position $(X_m, Y_m)$ of a paint brush pattern in accordance with the generated random numbers.

In this embodiment, since the same random number generation parameters are used in processing of original image data G and B, the painting positions and the number of painting positions are the same as those of the original image data R.

Step S8

The paint brush patterns formed in step S3 and to be drawn at the painting positions determined in step S7 are determined. More specifically, directivities of five types of edges (0: no edge, 1 to 4: edges having directions) are recorded at the painting positions on the work memory 33. The paint brush pattern reduction/rotation unit 9 stores the five types of paint brush patterns. The paint brush pattern selection unit 8 selects a paint brush pattern matching with the directivity of each edge data in the work memory 33 from those in the paint brush pattern reduction/rotation unit 9. As a result, a paint brush pattern having no directivity is drawn on a portion having no edge, and a paint brush pattern having a directivity matching with that of an edge is drawn on a portion having the edge. Therefore, a pictorial expression with touches having directivities can be realized like a painting by an actual painter. Since the five types of paint brush patterns can be formed by the teacher or the student using the menu shown in FIG. 9, various pictorial expressions can be realized by changing the shapes of paint brush patterns.

Step S9

The painting unit 10 performs painting using the paint brush pattern data selected in step S8 at the painting positions generated in step S7.

Figure 7:
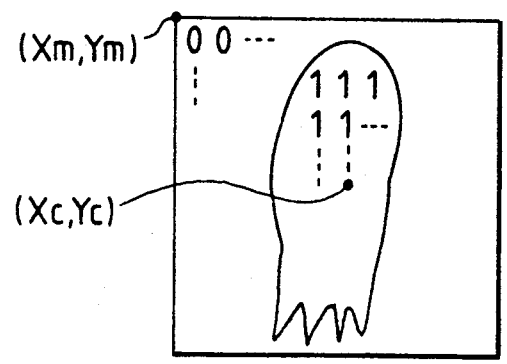
FIG. 7 shows the relationship between a painting start position $(X_m, Y_m)$, and a central position $(X_c, Y_c)$ of selected paint brush pattern data.

FIG. 7 shows the relationship between the generated painting start position $(X_m, Y_m)$, and a central position $(X_c, Y_c)$ of paint brush pattern data. Original image data and pattern data are aligned to have the relationship shown in FIG. 7. More specifically, new write data $C_i(x', y')$ for painting is obtained according to the following equation (6):

$$C_i(X',Y') = P(x,y) \times a_i(x_c, y_c) \quad (4)$$
$$\text{When}$$
$$C_i(x',y') = 0,$$
$$C_i(X',Y') = a_i(X',Y')$$

where i: R, G, B $a_i(x_c, y_c)$: original image data corresponding to central position of paint brush pattern data P(x, y): paint brush pattern data at address (x, y), and 0 or 1

(x', y') data position of original image or output image corresponding to address (x, y) of paint brush pattern data More specifically, in equation (4), original image data $a_i(x_c, y_c)$ corresponding to the central position of paint brush pattern data represents data of the paint brush pattern data, and a portion having paint brush pattern data=1 is replaced with the above-mentioned representative value, thereby painting a paint brush pattern. The painting results are written in the output image memories 35 to 37 in the order of R, G, and B.

The contents of the output image memories 35 to 37 are reduced at a proper ratio by the image memory controller 13, and are then written in the display image memories 21 to 23. Therefore, a change in image can be confirmed on the monitor in real time.

In the above embodiment, original image data $a_i(x_c, y_c)$ is set to be a representative value. Alternatively, an average value of peripheral data of the data $a_i(x_c, y_c)$ may be used, or an average value of original image data corresponding to positions where paint brush pattern data P(x, y)=1 may be used, or a value obtained by an arithmetic operation using maximum and minimum values may be used.

Step S10

The CPU 1 checks if the set number of painting processing operations are performed in the painting unit 10 (FIG. 1). If NO in step S10, the flow returns to step S7; otherwise, the flow advances to step S11.

Step S11

The CPU 1 checks if painting processing is ended for the three planes of image data R, G, and B. If NO in step S11, the flow returns to step S7 in FIG. 2, and processing for the remaining plane or planes is started. If YES in step S11, the flow advances to step S12.

Step S12

Figure 10:
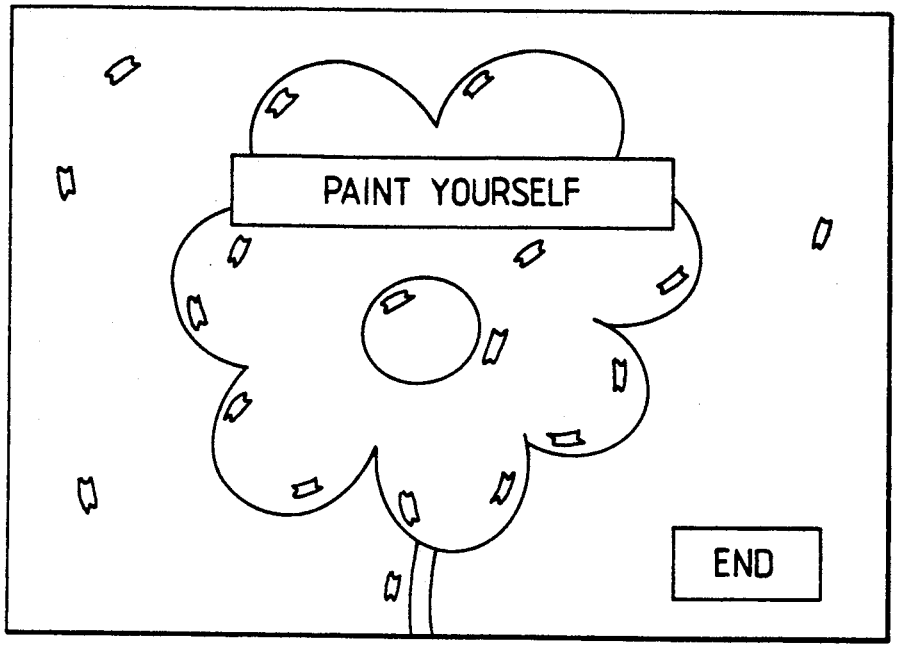
FIG. 10 shows a result obtained by automatically painting a paint brush pattern on an original image pattern.

Automatic processing is ended at this time, and a screen displays an image as shown in FIG. 10. The processing may be ended in this state. In this case, the student selects the item "end" using his or her P.D, to send an end signal to the CPU 1. Thereafter, the teacher selects the item "end" to approve it, thereby sending an end signal to the CPU 1. Thus, the processing is ended, and the flow advances to step S14. When processing is to be continued in a manual mode, the student or the teacher depresses a button of his or her P.D on the screen, and the control enters the manual mode, i.e., the flow advances to step S13. In this case, any position may be depressed.

Manual Mode

Step S13

In the manual mode, an operator can draw a paint brush pattern at a desired position using an input device such as the P.D. When the button of the P.D is depressed, the painting start position generation unit 7 fetches position data of the P.D, and substitutes it into the painting start position. The flow then returns to step S8. In this case, the number of painting processing operations is set to be 1. Both the teacher and the student need only trace an image while depressing the buttons of their P.Ds, so that a paint brush pattern matching with the directivity of an edge can be automatically drawn. As a result, a given range can be locally emphasized. In this embodiment, an operator selects only painting position data. In addition, a mode for selecting a direction, size, and color of a paint brush pattern is also prepared, and an operator can make appropriate selection.

In this manual mode, when a designated position is continuously shifted by a P.D, desired paint brush patterns can be drawn at painting positions determined by generated random numbers.

When the teacher depresses the central button of his P.D, a menu for selecting a direction, size, and color of a paint brush pattern is displayed on the screen, as shown in FIG. 20, and the student or the teacher can perform painting while desirably selecting the direction, size, and color of a paint brush. More specifically, various modifications of a pattern formed in FIG. 9 can be made in FIG. 20.

Figure 11:
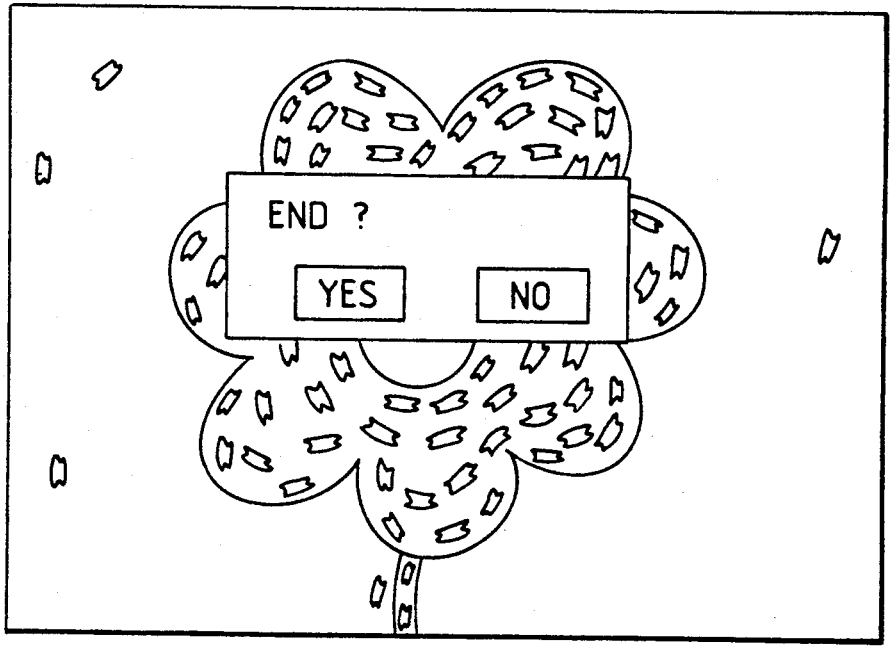
FIG. 11 shows a result obtained when painting positions of a paint brush pattern are manually designated on the pattern shown in FIG. 10.

When the painting operation in the manual mode is to be ended, the teacher orally gets student's consent, and then depresses the right button of his or her P.D. Thus, an end menu shown in FIG. 11 is displayed. When the operation is to be ended, the student selects "yes", and then, the teacher selects "yes". The flow then advances to step S14.

Step S14

Data stored in the output image memories 35 to 37 are transferred to an external output apparatus connected to the image data I/O 26, and are output as a hard copy, thus ending all the processing operations.

In the description of the embodiment, all the painting processing operations are performed by digital arithmetic operations. However, the present invention is not limited to this. For example, a robot may have several types of actual paint brushes, and may be caused to draw selected or rotated paint brush pattern data at randomly generated painting positions.

In the above embodiment, paint brush pattern data is selected in accordance with the presence/absence of an edge and a directivity of an edge. However, the present invention is not limited to this. For example, a spatial frequency component of original image data may be analyzed to select paint brush pattern data. Painting may be performed using the same paint brush pattern without detecting the directivity of an edge, or a paint brush pattern may be selected randomly.

In the above embodiment, a differential operator of a $3 \times 3$ pixel matrix is used in edge extraction. However, the present invention is not limited to this. For example, the size or content of the differential operator may be changed in accordance with the pixel size of an original image, the size of paint brush pattern data, and the like.

Arrangement of Color Laser Copy Apparatus 46

Figure 3:
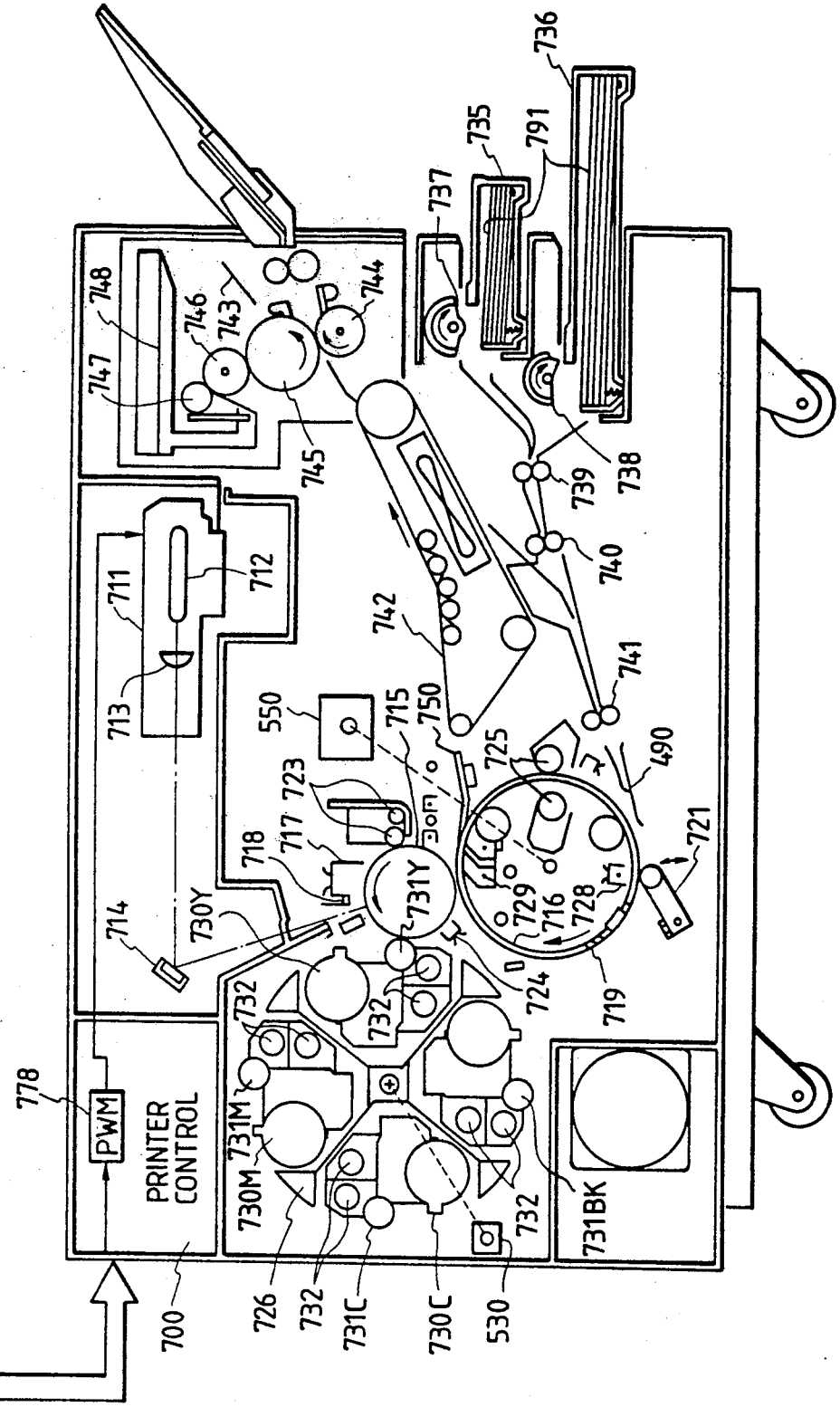
FIG. 3 is a schematic sectional view showing a structure of a color laser copy apparatus.

The color laser copy apparatus 46 shown in FIG. 14 will be briefly described below with reference to FIG. 3. A pulse-width modulation (PWM) circuit 778 converts a multi-value digital image signal from the video controller 25 shown in FIG. 1 into an analog image signal, and compares the analog image signal with a triangular wave having a predetermined period, thus forming a PWM signal. The PWM signal is applied to a scanner 711 to ON/OFF-modulate a laser, thereby forming a halftone image. The scanner 711 comprises a laser output unit for converting the image signal from the PWM circuit 778 into a light signal, a polygonal (e.g., octahedral) mirror 712, a motor (not shown) for rotating the mirror 712, an f/θ lens (focusing lens) 713, and the like. An optical path of a laser beam from the scanner 711 is changed by a reflection mirror 714, and the laser beam becomes incident on a photosensitive drum 715. A laser beam emerging from the laser output unit is reflected by the polygonal mirror 712, and linearly scans (raster-scans) the surface of the photosensitive drum 715 via the lens 713 and the mirror 714, thus forming a latent image corresponding to an input image.

A primary charger 717, an entire surface exposure lamp 718, a cleaner unit 723 for recovering a residual toner which is not transferred, and a pre-transfer charger 724 are arranged around the photosensitive drum 715.

A developing unit 726 develops an electrostatic latent image formed on the photosensitive drum 715 by laser exposure. The developing unit 726 comprises developing sleeves 731Y, 731M, 731C, and 731Bk each of which is brought into contact with the photosensitive drum 715 to directly develop an image, toner hoppers 730Y, 730M, 730C, and 730Bk for storing auxiliary toners, and screws 732 for feeding a toner. These members are arranged around a rotating shaft P of the developing unit. For example, when a yellow toner image is formed, yellow toner development is performed at a position illustrated in FIG. 3. When a magenta toner image is formed, the developing unit 726 is rotated about the shaft P (FIG. 3), so that the developing sleeve 731M in a magenta developer is located at a position contacting the photosensitive drum 715. The same applies to cyan and black development operations.

A transfer drum 716 transfers a toner image formed on the photosensitive drum 715 onto a paper sheet. An actuator plate 719 for detecting a moving position of the transfer drum 716, a position sensor 720 which comes closer to the actuator plate 719 to detect that the transfer drum 716 is moved to a home position, a transfer drum cleaner 725, a paper pressing roller 727, a discharger 728, and a transfer charger 729 are arranged around the transfer roller 716.

A paper sheet is fed from one of paper feed cassettes 735 and 736 for storing paper sheets by a corresponding one of paper feed rollers 737 and 738, and is conveyed via timing rollers 739, 740, and 741 for synchronizing paper feed and convey timings. The paper sheet is then guided along a paper guide 749, and is wound around the transfer drum 716 while its leading edge is gripped by a gripper (to be described later), thus starting an image formation process.

A drum rotating motor 550 synchronously rotates the photosensitive drum 715 and the transfer drum 716. After the image formation process, the paper sheet is peeled from the transfer drum 716 by a peeling pawl 742. The paper sheet is then conveyed by a conveyor belt 742 to an image fixing unit 743 for fixing an image on a conveyed paper sheet. The image fixing unit 743 comprises a pair of thermocompression rollers 744 and 745. Note that a video output from the arrangement shown in FIG. 1 is received by an arrangement shown in FIG. 3. However, almost all the blocks shown in FIG. 1 may be arranged in a printer control 700 shown in FIG. 3.

Figure 5:
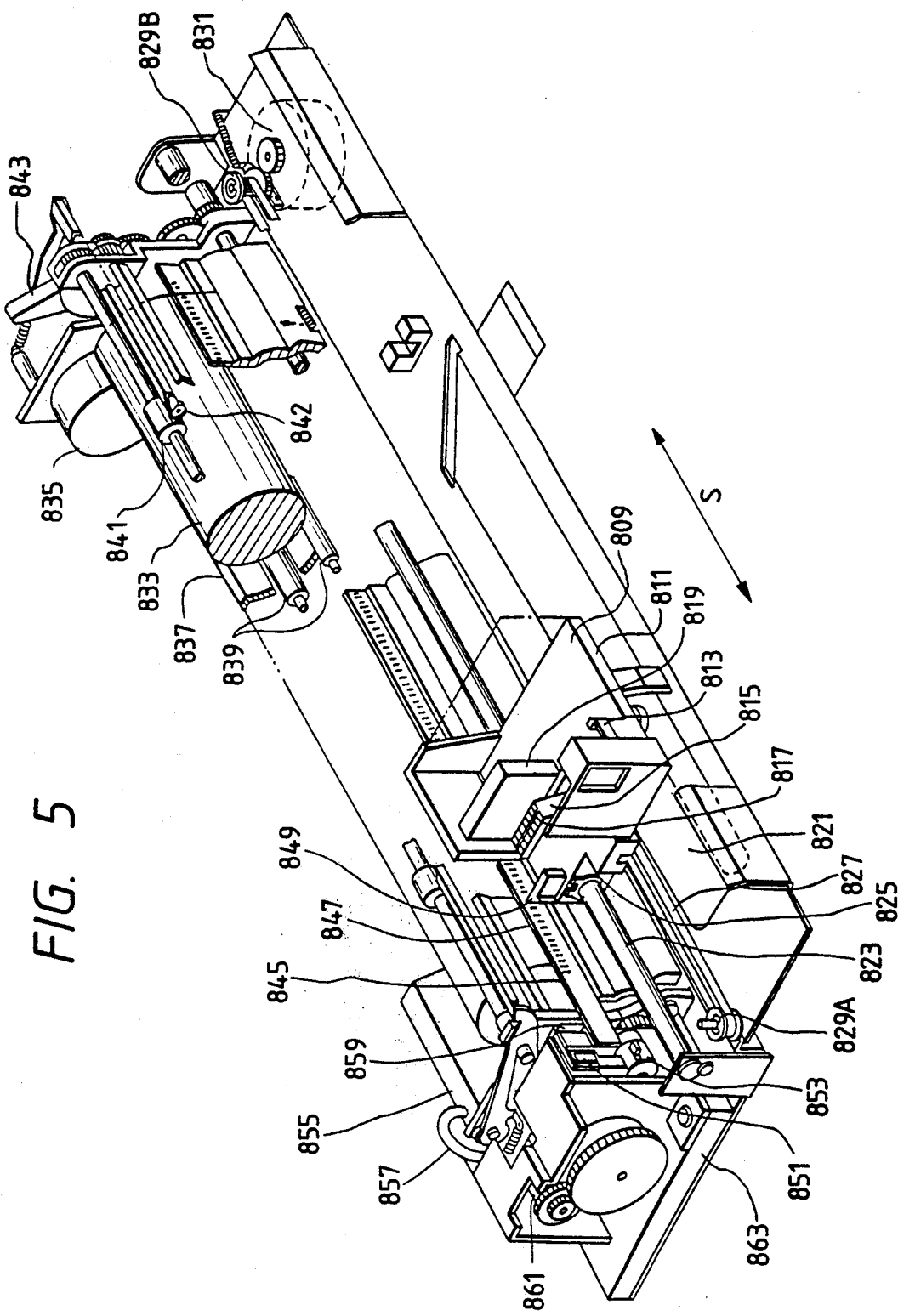
FIG. 5 is a perspective view showing a structure of a bubble-jet printer.

FIG. 5 shows an arrangement of the bubble-jet printer 45 (FIG. 14) according to the present invention. Needless to say, the printer 45 has a means (e.g., a buffer) for receiving a video output from the video controller 25 shown in FIG. 1. When the printer 45 cannot express gradation, processing for expressing pseudo gradation by a density pattern method or a dither pattern method must be performed.

A head cartridge 809 having an ink-jet recording head is mounted on a carriage 811 for scanning the cartridge in a direction S in FIG. 5 (the thermal transfer color printer 47 shown in FIG. 14 has the same arrangement). More specifically, the head cartridge 809 is mounted on the carriage 811 by a hook 813 which can be operated by a lever 815. A marker 817 is arranged on the lever 815. The marker 817 indicates a scale mark formed on a cover (to be described later) to allow an operator to read a printing position or a setting position of the recording head of the head cartridge. A support plate 819 supports an electrical connection unit for the head cartridge 809. The electrical connection unit is connected to a main body control unit via a flexible cable 821.

The carriage 811 is guided along a guide shaft 823 in the direction S. The guide shaft 823 is inserted in a bearing 825 of the carriage 811. The carriage 811 is fixed to a timing belt 827 for transmitting power for moving the carriage 811 in the direction S. The timing belt 827 is looped between pulleys 829A and 829B arranged at two side portions of the apparatus. A driving force from a carriage motor 831 is transmitted to one pulley 829B via a transmission mechanism such as gears.

A platen roller 833 regulates a recording surface of a recording medium such as a paper sheet (to be referred to as a recording sheet hereinafter), and conveys the recording sheet during, e.g., recording. The platen roller 833 is driven by a convey motor 835. A paper pan 837 guides the recording sheet from a paper feed tray 4 side to a recording position. Feed rollers 839 are arranged midway along a feed path of the recording sheet, and press the recording sheet toward the platen roller 833 to convey it. Exhaust rollers 841 are arranged at a downstream side of a recording position in a convey direction of the recording sheet, and exhaust the recording sheet toward an exhaust port (not shown). Spurs 842 are arranged in correspondence with the exhaust rollers 841, and press the rollers 841 via the recording sheet so as to cause the exhaust rollers 841 to generate a force for conveying the recording sheet. A release lever 843 is used to release biasing forces of the feed rollers 839, a pressing plate 845, and the spurs 842 when the recording sheet is set.

The pressing plate 845 suppresses floating of the recording sheet near the recording position to assure a contact state to the platen roller 833. In this embodiment, the ink-jet recording head for injecting an ink to perform recording is adopted as a recording head. Therefore, a distance between an ink injection port formation surface of the recording head and a recording surface of a recording sheet is relatively small, and must be strictly controlled to prevent contact between the recording sheet and the injection port formation surface. Therefore, it is effective to arrange the pressing plate 845. A scale mark 847 is formed on the pressing plate 845. A marker 849 is arranged on the carriage 811 in correspondence with the scale mark. An operator can read the printing position and the setting position of the recording head in accordance with the scale mark and the marker.

A cap 851 formed of an elastic member such as rubber opposes the ink injection port formation surface of the recording head at the home position, and is supported to be able to be in contact with/separated from the recording head. The cap 851 is used for protecting the recording head in a non-recording mode, and is also used in injection recovery processing of the recording head. In the injection recovery processing, processing (preliminary injection) for driving energy generation elements arranged in ink injection ports and utilized to inject an ink so as to inject an ink from all the injection ports, thereby removing injection error factors such as bubbles, dust, a viscosity-increased ink unsuitable for recording, and the like, and processing for forcibly injecting an ink from the injection ports to remove injection error factors in addition to the preliminary injection are performed.

A pump 853 is used to apply a suction force for forcibly discharging an ink, and for drawing an ink received by the cap 851 by suction in the injection recovery processing by the forcible discharge or in the injection recovery processing by the preliminary injection. A discharged ink tank 855 stores a discharged ink drawn by suction by the pump 853. The pump 853 and the tank 855 communicate with each other via a tube 857.

A blade 859 is used to wipe the injection port formation surface of the recording head. The blade 859 is supported to be movable between a position where it projects toward the recording head to wipe the surface in a head movement process, and a retracted position where it is not engaged with the injection port formation surface. A power from a recovery system motor 861 is transmitted to a cam device 863 for driving the pump 853 and moving the cap 851 and the blade 859.

As described above, according to this embodiment, the direction of an edge of an image is detected in accordance with formation of a desired pattern, and painting is performed using a paint brush pattern along the detected direction. Therefore, a high-quality processing result like a painting painted by a painter can be obtained.

According to this embodiment, a value obtained by correcting a maximum value of data representing lightnesses of pixels around an objective pixel is determined as a value of data representing a lightness of the objective pixel, and the above-mentioned processing can be performed for predetermined image data consisting of a plurality of pixels. Thus, an edge can be dispersed, and a high-quality pictorial processing result of image data can be effectively obtained.

Furthermore, according to this embodiment, after lightnesses of data are dispersed, the direction of an edge portion of image data can be discriminated. Thus, painting can be performed using a paint brush pattern along an edge direction, and it is possible to make an expression approximate to a painting of a painter.

According to this embodiment, at least a painting position of a predetermined pattern can be selected, and a unique, high-grade pictorial processing result can be obtained by a simple operation. An operator can emphasize a desired portion, and his or her will can be reflected in a result as compared to a case wherein the entire image plane is uniformly processed. In addition, a predetermined pattern can be drawn at a desired position in accordance with the directivity of image data.

According to the present invention, a pattern can be formed, and a means for changing the directivity, size, color, and the like of the pattern is arranged, so that the individuality and will of an operator can be reflected in an output result.

According to this embodiment, a plurality of persons can simultaneously perform operations using a plurality of instruction means such as P.Ds. Therefore, a teacher can easily teach an operation method to a student. Since the plurality of P.Ds have a functional difference, even if a student makes a wrong operation, an operation flow can be prevented from advancing to the next step.

What is claimed is:

1. An image processing apparatus comprising:
   paint brush pattern forming means for forming a paint brush pattern;
   input means for inputting image data; and
   processing means for processing the image data input by said input means in accordance with the paint brush pattern formed by said paint brush pattern forming means,
   wherein said paint brush pattern forming means forms an arbitrary paint brush pattern on the basis of shape data input by an operator.

2. An apparatus according to claim 1, wherein said input means inputs a plurality of color image data, and said processing means processes each of the plurality of color image data in accordance with the paint brush pattern.

3. An apparatus according to claim 1, wherein said paint brush pattern forming means performs rotation processing of data of one paint brush pattern to form a plurality of paint brush patterns.

4. An apparatus according to claim 3, further comprising discrimination means for discriminating a directivity of an edge portion of the image data, and wherein said processing means selects one of the plurality of paint brush patterns in accordance with the directivity discriminated by said discrimination means, and processes the image data in accordance with the selected paint brush pattern.

5. An apparatus according to claim 1, wherein said processing means performs processing for replacing a plurality of pixel data representing the paint brush pattern with the input image data of one pixel, for input image data of a plurality of pixels.

6. An image processing apparatus comprising:
   input means for inputting image data;
   means for extracting edge data of the image data input by said input means;
   dispersion means for dispersing the edge data;
   discrimination means for discriminating a directivity of an edge on the basis of the edge data dispersed by said dispersion means; and
   processing means for processing the image data input by said input means on the basis of the directivity discriminated by said discrimination means,
   wherein said dispersion means determines data obtained by correcting a maximum value of edge data of an objective pixel and a plurality of pixels peripheral to the objective pixel as edge data of the objective pixel, thereby dispersing the edge data.

7. An apparatus according to claim 6, further comprising storage means for storing a plurality of paint brush patterns having a plurality of directivities, and wherein said processing means selects one of the plurality of paint brush patterns on the basis of the directivity of the edge, and converts the input image data into a pictorial image.

8. An apparatus according to claim 7, wherein said storage means stores a paint brush pattern formed by an operator, and paint brush patterns obtained by rotation processing of the formed paint brush pattern.

9. An image processing apparatus comprising:
   input image for inputting an image for one image plane;
   first processing means for performing automatic painting processing of the input image for one image plane in accordance with a paint brush pattern; and
   second processing means for performing painting processing of a portion designated by an operator on the basis of the paint brush pattern after the processing by said first processing means is completed.

10. An image processing apparatus comprising:
    means for forming a desired pattern;
    changing means for changing a directivity, a size, or a color of the formed pattern; and
    painting means for painting the pattern changed by said changing means on an image,
    wherein said forming means forms an arbitrary pattern on the basis of shape data input by an operator.

11. An apparatus according to claim 10, further comprising input means for inputting an image, and means for detecting a directivity of an edge from the input image, and wherein said painting means selects the changed pattern on the basis of the directivity of the edge, and paints the changed pattern on the input image.

12. An image processing means for obtaining a pictorial image from an input image, comprising the steps of:
   inputting image data from image input means;
   forming a paint brush pattern on the basis of an input from an operator; and
   executing painting processing of the formed paint brush pattern on the input image data,
   wherein, in said paint brush pattern forming step, an arbitrary point brush pattern is formed on the basis of shape data input by the operator.

13. A method according to claim 12, further including the steps of:
   forming a plurality of paint brush patterns having different directivities; and
   selecting one of the plurality of paint brush patterns on the basis of a directivity of an edge of the image data to perform the painting processing.

14. A method according to claim 13, wherein the plurality of paint brush patterns are formed by performing rotation processing of one paint brush pattern formed on the basis of the input from the operator.

* * * * *

UNITED STATES PATENT AND TRADEMARK OFFICE
CERTIFICATE OF CORRECTION

PATENT NO. : 5,283,841

DATED : February 1, 1994

INVENTOR(S) : SHIGEKI YAMADA

It is certified that error appears in the above-identified patent and that said Letters Patent is hereby corrected as shown below:

On drawing sheet

IN THE DRAWINGS

Sheet 7 of 15, FIG. 9, "PALLETTE" should read --PALETTE--.
Sheet 10 of 15, FIG. 13, "PALLETTE" should read --PALETTE--.

COLUMN 1

Line 40, "a" should be deleted.

COLUMN 6

Line 48, "pallette" should read --palette--.

COLUMN 7

Line 12, "pallette" should read --palette--.
Line 15, "pallette." should read --palette.--.
Line 22, "pallette," should read --palette,--.
Line 46, "5" should be deleted.

COLUMN 12

Line 37, "equation (6):" should read --equation (4):--.

COLUMN 15

Line 19, "roller 716." should read --drum 716.--.

COLUMN 19

Line 7, "means" should read --method--.

UNITED STATES PATENT AND TRADEMARK OFFICE
CERTIFICATE OF CORRECTION

PATENT NO. : 5,283,841

DATED : February 1, 1994

INVENTOR(S) : SHIGEKI YAMADA

It is certified that error appears in the above-identified patent and that said Letters Patent is hereby corrected as shown below:

COLUMN 20

Line 2, "point" should read --paint--.

Signed and Sealed this

Sixteenth Day of August, 1994

Attest:

BRUCE LEHMAN

Attesting Officer

Commissioner of Patents and Trademarks